United States Patent
Morikami et al.

(10) Patent No.: US 12,017,571 B2
(45) Date of Patent: Jun. 25, 2024

(54) TRAILER FOR AVIATION CONTAINER TRANSPORTATION

(71) Applicant: HAMANA WORKS Co., Ltd., Hamamatsu (JP)

(72) Inventors: Yusuke Morikami, Hamamatsu (JP); Masahiro Suenaga, Hamamatsu (JP)

(73) Assignee: HAMANA WORKS CO., LTD., Hamamatsu (JP)

( * ) Notice: Subject to any disclaimer, the term of this patent is extended or adjusted under 35 U.S.C. 154(b) by 0 days.

(21) Appl. No.: 17/610,038

(22) PCT Filed: Feb. 24, 2021

(86) PCT No.: PCT/JP2021/006899
§ 371 (c)(1),
(2) Date: Nov. 9, 2021

(87) PCT Pub. No.: WO2021/172367
PCT Pub. Date: Sep. 2, 2021

(65) Prior Publication Data
US 2022/0194627 A1    Jun. 23, 2022

(30) Foreign Application Priority Data

Feb. 28, 2020 (JP) ................................ 2020-033233

(51) Int. Cl.
*B60P 1/02* (2006.01)
*B60P 1/44* (2006.01)
(Continued)

(52) U.S. Cl.
CPC ............... *B60P 1/6481* (2013.01); *B60P 1/02* (2013.01); *B60P 1/44* (2013.01); *B60P 1/52* (2013.01);
(Continued)

(58) Field of Classification Search
CPC .... B60P 1/02; B60P 1/022; B60P 1/44; B60P 1/52; B60P 1/6427; B60P 1/6436;
(Continued)

(56) References Cited

U.S. PATENT DOCUMENTS 3,207,087 A * 9/1965 Goby ..................... B61D 3/04
                                                    410/1
3,561,625 A * 2/1971 Dioguardi ............... B60P 1/52
                                                    198/584
(Continued)

FOREIGN PATENT DOCUMENTS

DE         4447207 A1 *  7/1995  ............... B60P 1/02
DE        19542816 A1 *  5/1997  ............... B60P 1/02
(Continued)

OTHER PUBLICATIONS

Aug. 30, 2022 translation of International Preliminary Report on Patentability issued in International Patent Application No. PCT/JP2021/006899.
(Continued)

*Primary Examiner* — James Keenan
(74) *Attorney, Agent, or Firm* — Oliff PLC

(57) ABSTRACT

A container deck of a trailer includes a front mounting floor, a central elevating floor, a rear mounting floor and a rear elevating floor, the central elevating floor is capable of loading and unloading the aviation container from the left or right side of the trailer vehicle body, the rear elevating floor is capable of loading and unloading the aviation container from any of the left and right sides and rear end, the front and rear mounting floors are provided with a roller conveyor for movably placing the container and a roller conveyor and a fixed side guide for slidably engaged the container, the central elevating floor is rotatable, the rear elevating floor includes a turntable and a ball conveyor, the central elevat- (Continued)

ing floor and the rear elevating floor are capable to move up and down a single container.

8 Claims, 14 Drawing Sheets

(51) Int. Cl.
*B60P 1/52* (2006.01)
*B60P 1/64* (2006.01)
*B60P 7/13* (2006.01)
*B64F 1/32* (2006.01)

(52) U.S. Cl.
CPC .......... *B60P 1/6427* (2013.01); *B60P 1/6436* (2013.01); *B60P 1/649* (2013.01); *B60P 7/13* (2013.01); *B64F 1/322* (2020.01)

(58) Field of Classification Search
CPC ......... B60P 1/6481; B60P 1/649; B60P 1/025; B60P 1/4428
USPC ................................ 104/45; 105/455; 410/1
See application file for complete search history.

(56) References Cited

U.S. PATENT DOCUMENTS

| | | | |
|---|---|---|---|
| 4,756,660 A | 7/1988 | Cesarini | |
| 4,787,808 A | 11/1988 | Shimoji et al. | |
| 4,898,509 A | 2/1990 | Thunnissen | |
| 5,246,241 A * | 9/1993 | Baver | B60P 1/6481 |
| | | | 280/789 |
| 5,378,105 A * | 1/1995 | Palko | B60P 1/44 |
| | | | 410/67 |
| 5,467,827 A * | 11/1995 | McLoughlin | B60P 1/6427 |
| | | | 414/535 |
| 7,665,788 B2 * | 2/2010 | Dibdin | B60P 1/02 |
| | | | 296/25 |
| 8,313,278 B2 * | 11/2012 | Simmons | B60P 7/08 |
| | | | 414/535 |
| 2019/0351801 A1 * | 11/2019 | Rousselle | B60P 1/36 |

FOREIGN PATENT DOCUMENTS

| | | | | |
|---|---|---|---|---|
| DE | 202007009734 U1 | 9/2007 | | |
| EP | 698525 A1 * | 2/1996 | ............... | B60P 1/02 |
| EP | 1741594 A2 | 1/2007 | | |
| JP | S51-151918 A | 12/1976 | | |
| JP | S60-203541 A | 10/1985 | | |
| JP | S63-097445 A | 4/1988 | | |
| JP | 2017-65580 A | 4/2017 | | |

OTHER PUBLICATIONS

Apr. 20, 2021 Search Report issued in International Patent Application No. PCT/JP2021/006899.
Dec. 9, 2022 Extended European Search Report issued in European Patent Application No. 21761858.6.

* cited by examiner

TRAILER FOR AVIATION CONTAINER TRANSPORTATION

TECHNICAL FIELD

The present invention relates to a trailer for aviation container transportation, and more particularly to a trailer for aviation container transportation that allows an aviation container unloaded from an aircraft to be transported directly outside the airport.

BACKGROUND ART

Conventionally, the transport of air cargo, for example aviation containers, uses a transport vehicle called a low-floor Dolly to carry in and out the cargo to and from the aircraft body in the airport, but Dolly collects containers once in a dedicated collection site located on the airport premises because Dolly cannot run roads outside the airport, where the cargo is loaded onto and unloaded from a dedicated transport vehicle.

However, it took time to carry out the cargo out of the airport and to load and unload them from outside the airport with Dolly at the collection premises, and efficiency improvement was desired.

It is also conceivable to use transport vehicles capable of traveling outside the airport for carrying cargo into and out of aircraft. In this case, the vehicle would be parked between aircrafts parked in the parking lot at the last possible distance, but it was difficult to carry in and out the aviation container at the same height as the dolly. For example, it was difficult to carry in and out the aviation container using a forklift because of interference between the forklift and the aircraft. On the other hand, the dolly is an exclusive transport vehicle in an airport, and it has been difficult to drive the dolly on a road outside the airport.

As shown in Patent Document 1 discloses that "when a container is loaded from an aircraft, a trailer is laid on a cargo unloading section of the aircraft." However, the trailer described in Patent Document 1 is actually a part of a cart or a Dolly, and is used when loading or unloading one container, and does not have a configuration for placing plurality of aviation containers, driving them on roads outside the airport, and transporting the containers.

CITATION LIST

Patent Literature

Patent Literature 1: Japanese Patent Application Laid-Open No. 63-97445

SUMMARY OF INVENTION

Technical Problem

The present invention has been made in view of the above-mentioned conventional problems, and it is an object of the present invention to provide a trailer for aviation container transportation, which is capable of loading and unloading an aviation container to be carried out (carried in) with an aircraft body from a lateral direction of a vehicle body via a container loading and unloading device such as a dolly, so that the trailer for aviation container transportation can be carried as it is out of an airport or into an airport.

Solutions to Problem

Trailer for aviation container transportation according to the present invention to solve the above problems comprise a horizontal container deck on which a plurality of aviation containers can be placed in a row in the front-rear direction, and a lashing device for fixing the aviation container placed on the container deck, wherein the container deck is provided with a horizontal elevating floor and a horizontal mounting floor, the horizontal elevating floor is on at least one of the vehicle body front-rear direction intermediate portion and the vehicle body rear end portion, and the horizontal elevating floor capable of loading and unloading the aviation container from any of the left and right sides of the trailer vehicle body, the horizontal mounting floor is adjacent to the elevating floor, and fixed on the vehicle body vertical direction, the mounting floor includes a roller conveyor and a pair of fixed side guides, the roller conveyor is provided horizontally at a position higher than the wheel house of the rear wheel, and a plurality of horizontal rollers rotatably supported in the horizontal axis of the trailer width direction are arranged in the trailer front-rear direction, the roller conveyor for movably placing the aviation container in the front-rear direction, the pair of fixed side guides has the U-shape in the cross section of the vehicle body width direction, and, when the side perpendicular to the long side of the top panel of the aviation container of the rectangular in plan view and the short side, the container sliding parts of the short side direction on both sides of the bottom side of the aviation container is engaged slidably in the vehicle body front-rear direction, the elevating floor includes a turntable and a roller conveyor, and is integrally liftable and lowerable with the turntable and the roller conveyor in a state in which one aviation container is horizontally mounted with the height of the upper surface of the roller conveyor on the mounting floor being the upper limit height of the elevating floor and the height of the aviation container with respect to the container loading and unloading device, and a position lower than the wheel house of the rear wheel being the lower limit height of the elevating floor. the turntable, a single aviation container placed, is rotatable in a horizontal plane, the top panel of the aviation container is rectangular, and wherein the container deck is adapted to place the aviation container in a posture in which a rectangular side of the top panel is in a trailer front-rear direction in a plan view.

Effect of the Invention

In the present invention, the for aviation container transportation trailer has the effect that at least one of an intermediate portion in the front-rear direction of the vehicle body and a rear end portion of the vehicle body is provided with a liftable elevating floor including a turntable so that the aviation container can be loaded and unloaded from any direction of the trailer width direction, and that the aviation container can be placed laterally on the aircraft body in the airport to quickly load and unload the aviation container through a container loading/unloading device such as a dolly, and as it is, the aviation container can be transported to a destination through a road outside the airport, or the aviation container can be transported to the aircraft body from outside the airport to the side of the aircraft body and loaded into the aircraft body.

DESCRIPTION OF EMBODIMENTS

First Embodiment

As shown in FIGS. 1 to 4, a trailer for aviation container transportation (trailer hereinafter) 10 according to the embodiment 1 of the present invention has a front end connected to a connecting part 12A of an upper portion of a rear wheel of a tractor 12, and is pulled by the tractor 12 to travel.

Figure 3:
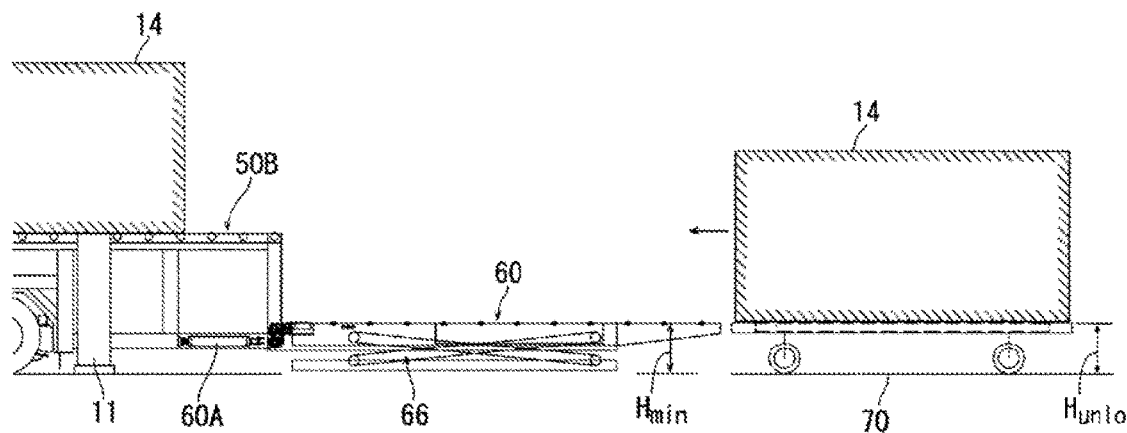
Figure 4:
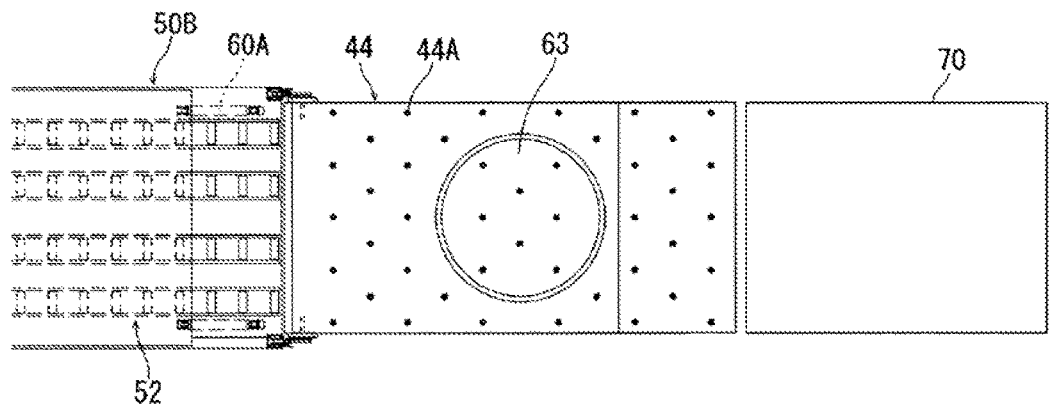

Reference number 70 to the right side of FIGS. 3 and 4 denotes a container loading and unloading device (in this embodiment 1, a cart or dolly loading and unloading an aviation container 14) for loading and unloading the aviation container 14 to and from the aircraft.

Figure 1:
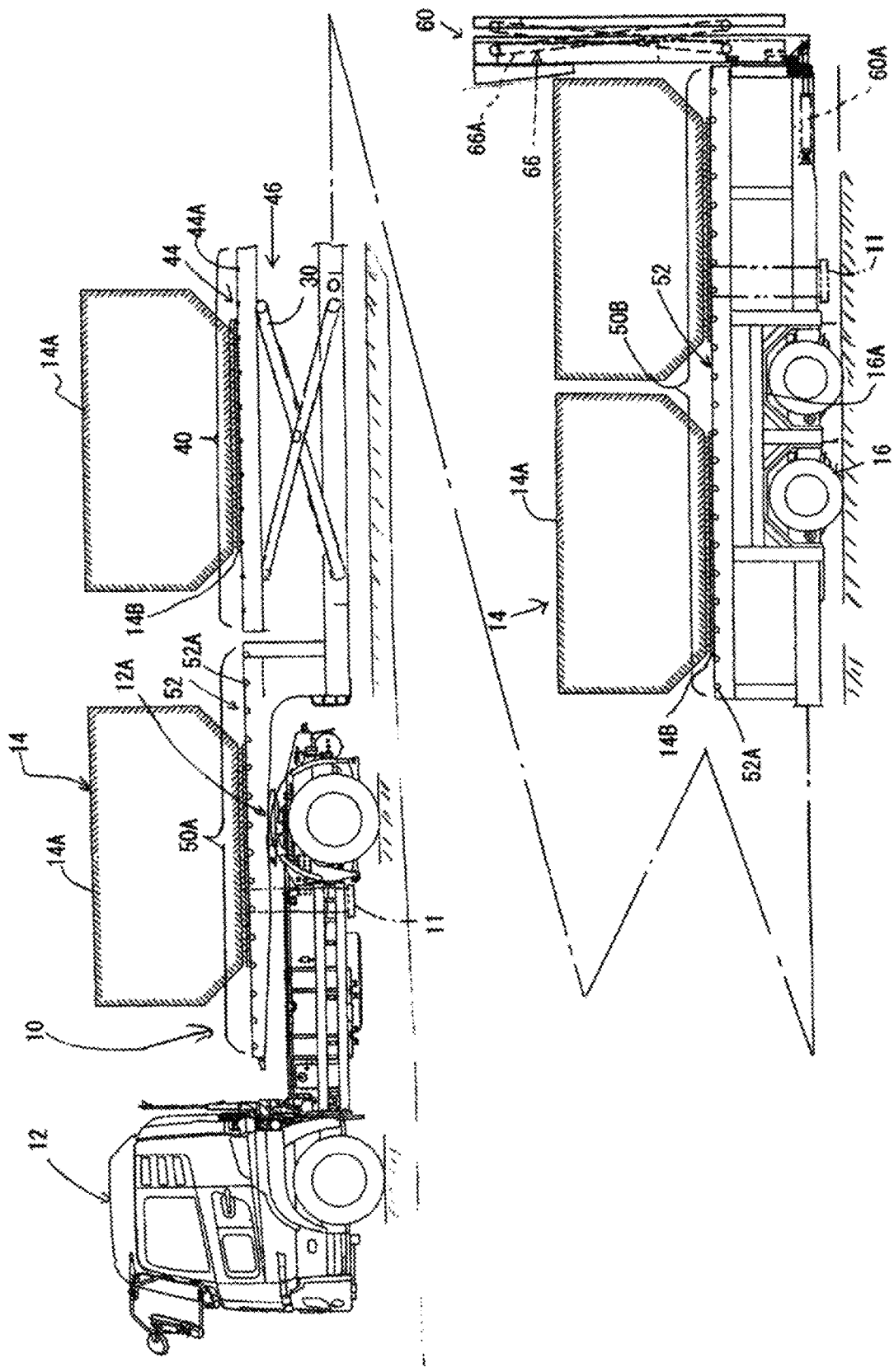
FIG. 1A side view showing a trailer for aviation container transportation according to a first embodiment of the present invention together with a tractor FIG. 2 Same plan view FIG. 3 Side view showing the rear of the trailer for aviation container transportation with the rear elevating floor deployed FIG. 4 Same plan view FIG. 5 Plan view similar to that shown in FIG. 2, which shows the state of loading aviation containers FIG. 6 VI-VI view of FIG. 5
Figure 5:
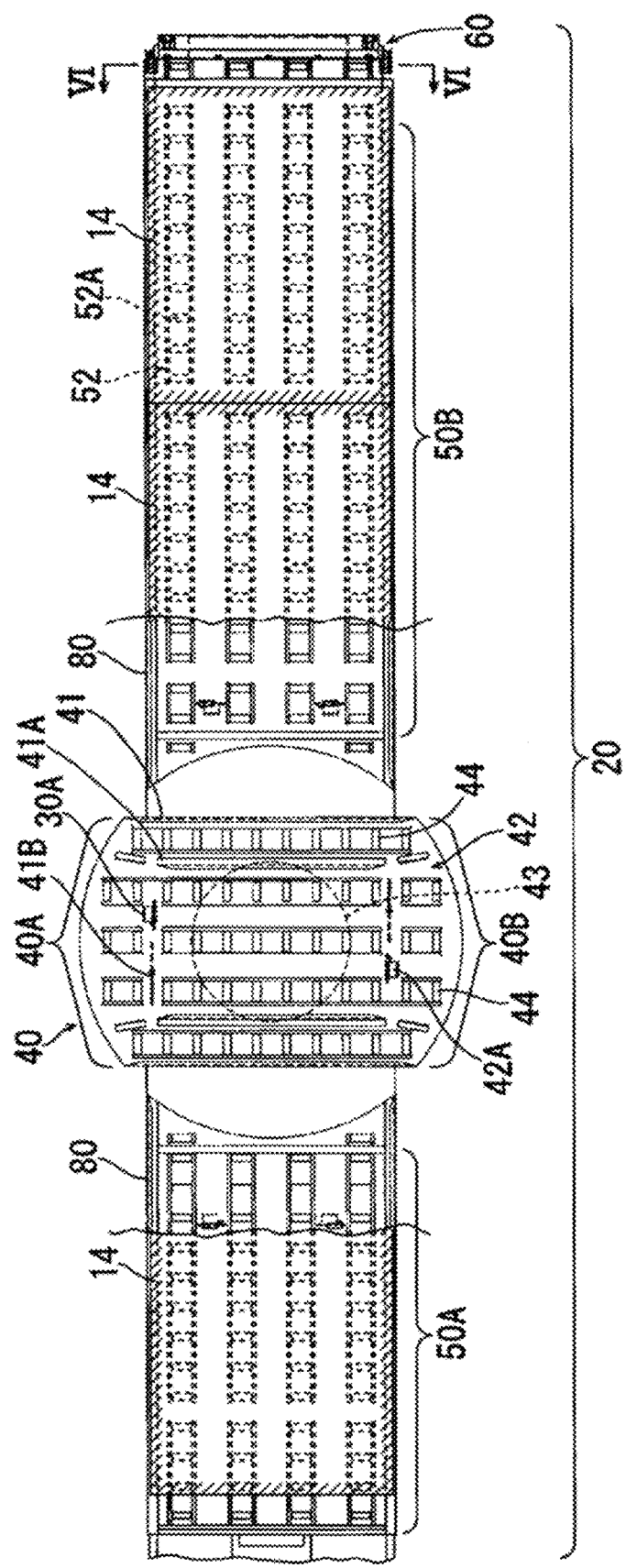

As shown in FIGS. 1 and 5, the trailer 10 according to the embodiment 1 includes a horizontal container deck 20 on which four aviation containers 14 can be placed, and a lashing device 30 (further details are described later) for fixing the aviation container 14 placed on the container deck 20.

The container deck 20 is composed of a central elevating floor 40 provided in the vehicle front-rear direction intermediate portion, a rear elevating floor 60 provided as an extended floor and gate floor in the rear end portion of the vehicle body, a front mounting floor 50A of the vehicle body front side of the central elevating floor 40, and a rear mounting floor 50B, rear side of the central elevating floor 40. Incidentally, when collectively referred to the central elevating floor 40 and the rear elevating floor 60 shall be "elevating floor". Further, a horizontal roller conveyor 44 and a ball roller conveyor 64, which will be described later, in the center elevation floor 40 and the rear elevating floor 60 are collectively referred to as "roller conveyor".

Figure 6:
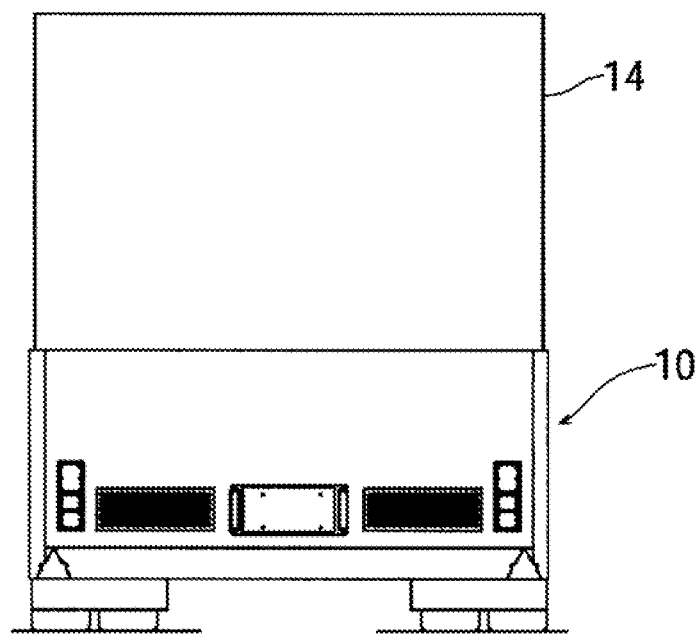

The rear elevating floor 60, as shown in FIGS. 3 and 4, when loading and unloading the aviation container 14 from the rear end of the trailer 10, is extended rearwardly to become an extended floor (described in detail later). FIG. 6 is a rear view of the trailer 10.

Figure 7:
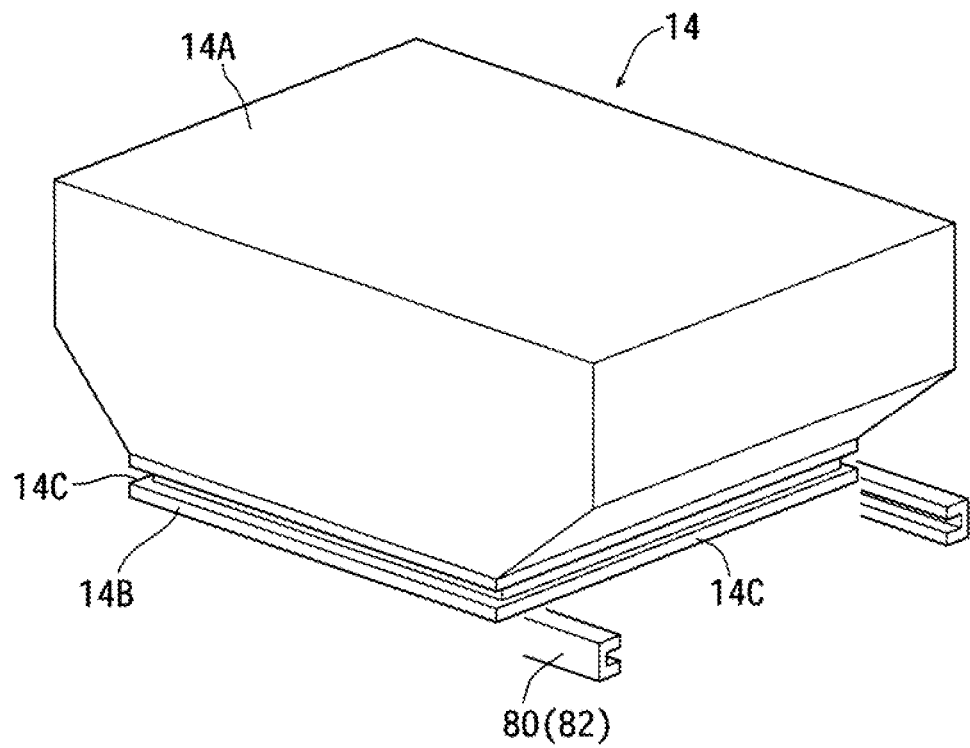
FIG. 7 Perspective view showing an aviation container

As shown in FIG. 7, the aviation container 14 has a rectangular top panel 14A thereof, the container deck 20, in a posture in which a rectangular side of the top panel 14A in a plan view is a trailer front-rear direction in a side-by-side arrangement of the aviation container 14 in the vehicle body front-rear direction, a latching hook 30A of the lashing device 30 in this state (see FIGS. 16 to 17; described later in detail) is adapted to be lashed by.

Each of the front mounting floor 50A and the central elevating floor 40 respectively has a length that can accommodate one aviation container 14. The rear mounting floor 50B has a length that can accommodate two aviation containers 14. The long side of the top panel 14A is along the vehicle body front-rear direction.

Figure 8:
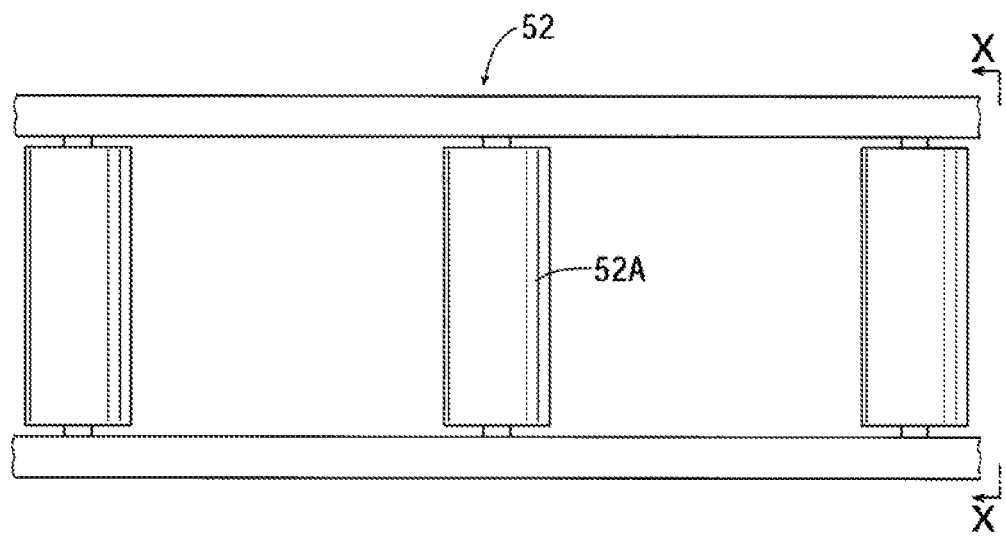
FIG. 8 Plan view showing an enlarged roller conveyor of a mounting floor in the trailer for aviation container transportation FIG. 9 Same side view FIG. 10 X-X view of FIG. 8
Figure 9:
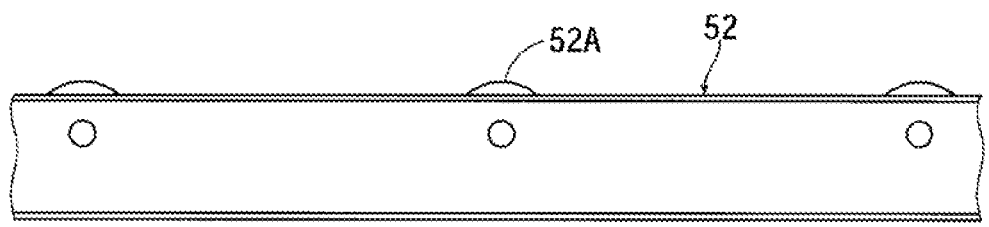
Figure 10:
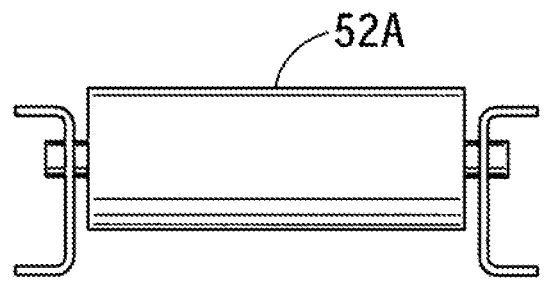

The front mounting floor 50A and the rear mounting floor 50B is provided horizontally at a position higher than a wheel house 16A of a rear wheel 16 of the trailer 10, and, as shown in FIGS. 8 to 10, respectively, a plurality of horizontal rollers 52A rotatably supported in the horizontal axis of the trailer width direction side by side in the trailer front-rear direction, constitute a fixed roller conveyor 52 for movably placing the aviation container 14 in the trailer front-rear direction.

Figure 11:
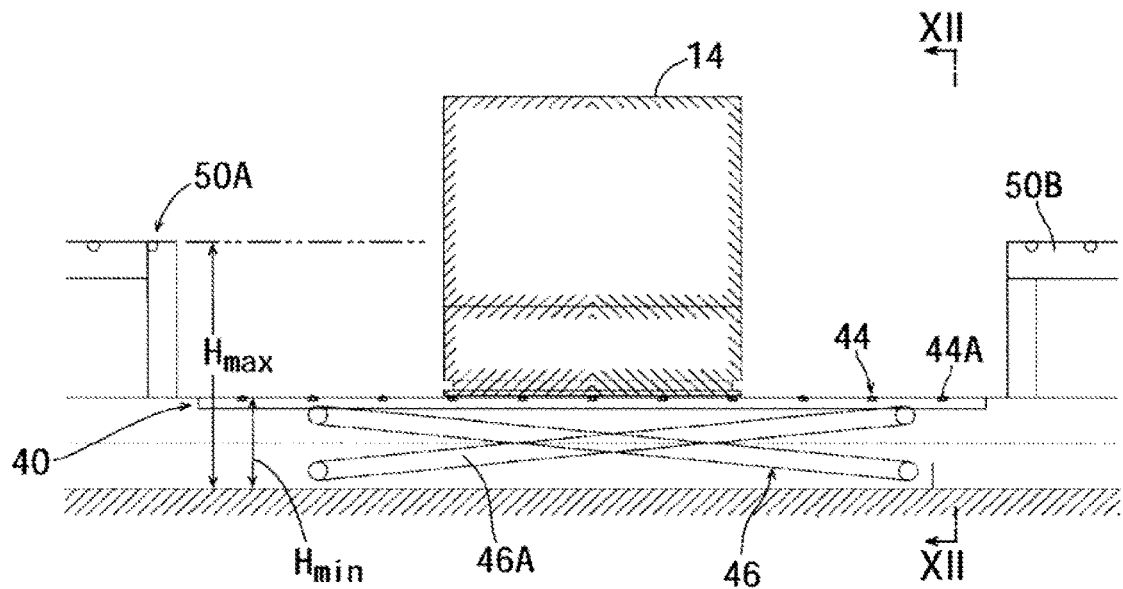
FIG. 11 Side view showing the state at the lower limit position of the central elevating floor and elevating mechanism in the trailer for aviation container transportation FIG. 12 Side view showing the loading status of the aviation container at the same upper limit position FIG. 13 Side view showing the state at the upper limit position of the rear elevating floor and up/down mechanism in the trailer for aviation container transportation FIG. 14 Front view showing a ball unit constituting a ball conveyor in a trailer for aviation container transportation FIG. 15 Same plan view FIG. 16 A plan view schematically showing the engagement state between the aviation container and side guide for guiding the aviation container in the front-rear direction of the vehicle body FIG. 17 XVII-XVII view of FIG. 16
Figure 12:
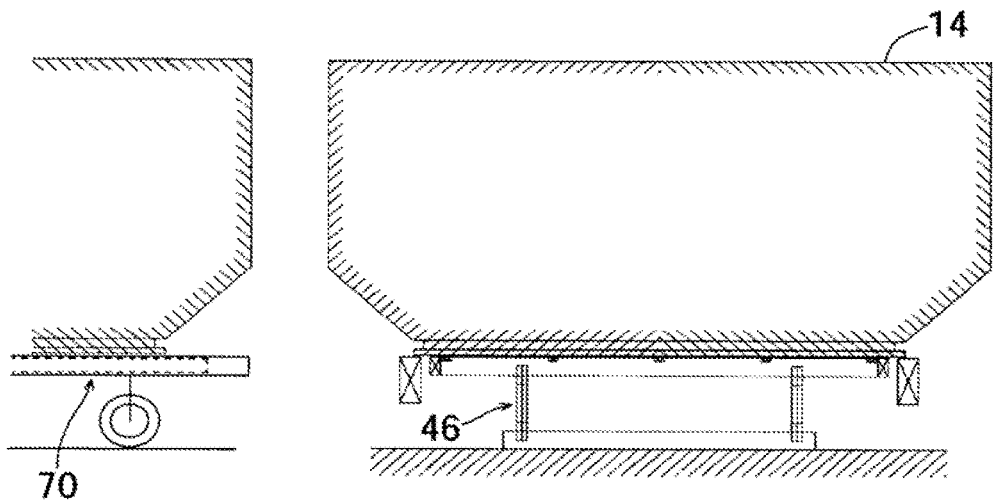

The central elevating floor 40 is provided at a position adjoining the front side of the wheel house 16A of the rear wheel 16, and as shown in FIGS. 11 and 12, the height of the fixed roller conveyor 52 is defined as an upper limit height of the lifting floor $H_{max}$, and a container loading/unloading height 70 is defined as a lower limit height $H_{min}$ of the elevating floor, between which it can be lifted and lowered by a center electric table lifter 46 including an X-link 46A.

The central elevating floor 40 has a horizontal roller conveyor 44 integrally fixed to the upper surface of the central turntable 43, and one of the aviation containers 14 mounted on the horizontal roller conveyor 44 is rotatable in the horizontal plane at a position between the upper limit height $H_{max}$ of the elevating floor and the lower limit height $H_{min}$ of the elevating floor.

Since the entire trailer 10 increases or decreases in vehicle height due to the loading or unloading, and tilts if there is a bias in the loading, as shown in FIG. 1, a total of four outriggers 11 are attached to both outer sides in the vehicle body widthwise directions at positions in contact with the front side of the connecting part 12A of the trailer vehicle body and positions in contact with the rear side of the rear wheels 16, respectively, so that the change in vehicle height and tilt of the trailer 10 are suppressed, and the lower limit height $H_{min}$ of the elevating floor becomes constant.

In particular, the outrigger 11 is configured so that the height of the trailer body can be adjusted so that the upper surfaces of the horizontal roller conveyor 44 on the central elevating floor 40 and the ball roller conveyor 64 (described in detail below) on the rear elevating floor 60, which are $H_{min}$ the lower limit height of the elevating floor, are 1 to 3 cm lower than the load height $H_{unlo}$ of the aviation container loading/unloading device when the aviation container is unloaded, and the upper surface of the ball conveyor 44, which is $H_{min}$ the lower limit height of the elevating floor, is 1 to 3 cm higher than the load height $H_{lo}$ of the container loading/unloading device when the container is unloaded.

The central elevating floor 40 is a configuration in which the whole is rotated in a horizontal plane integrally with the central turntable 43, in a plan view in a posture during the trailer 10 is running, being a long rectangular in the front-rear direction of the vehicle body, having an arc-shaped leading edge 40A which is convex in the front and an arc-shaped trailing edge 40B which is convex in the rear.

Arc radius of the arc-shaped leading edge 40A and the arc-shaped trailing edge 40B is adapted to coincide with the rotation locus of the outer peripheral portion when the central elevating floor 40 is rotated by the central turntable 43.

Further, the central elevating floor 40 is integrally provided with a pair of central movable side guides 41 in the short side direction of the cross-sectional U-shaped to engage with the container sliding part 14B slidably in the long side direction. Furthermore, in order to prevent the overrun of the aviation container 14 transferred to the central elevating floor 40 guided by the central movable side guide 41, a central stopper 42A is provided which is driven to a position to be a stopper in contact with the aviation container 14, or a retracted position without interference with the aviation container 14.

Central movable side guide 41 is configured to be integrally rotated with the central turntable 43, and the posture of aligning the vehicle body front-rear direction with respect to a fixed side guide 80, or a posture perpendicular to the fixed side guide 80.

The central elevating floor 40 includes a horizontal roller conveyor 44 for movably placing the aviation container 14 in the front-rear direction, the central movable side guide 41 in a state of being aligned in the vehicle body front-rear direction with respect to the fixed side guide 80. The horizontal roller conveyor 44 is composed of a plurality of horizontal rollers 44A rotatably supported in the horizontal axis of the trailer width direction by arranging in the trailer front-rear direction.

Figure 2:
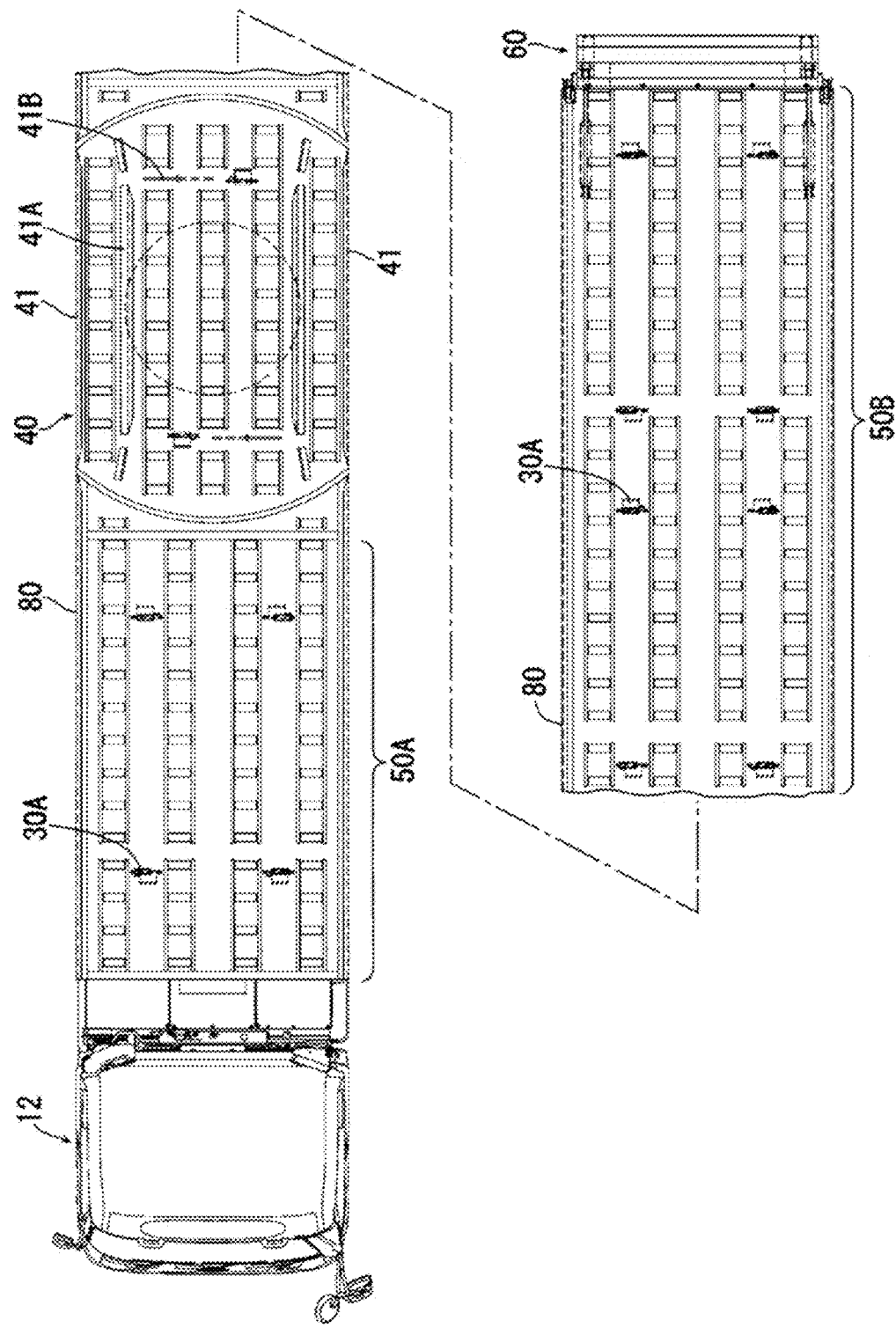
Figure 13:
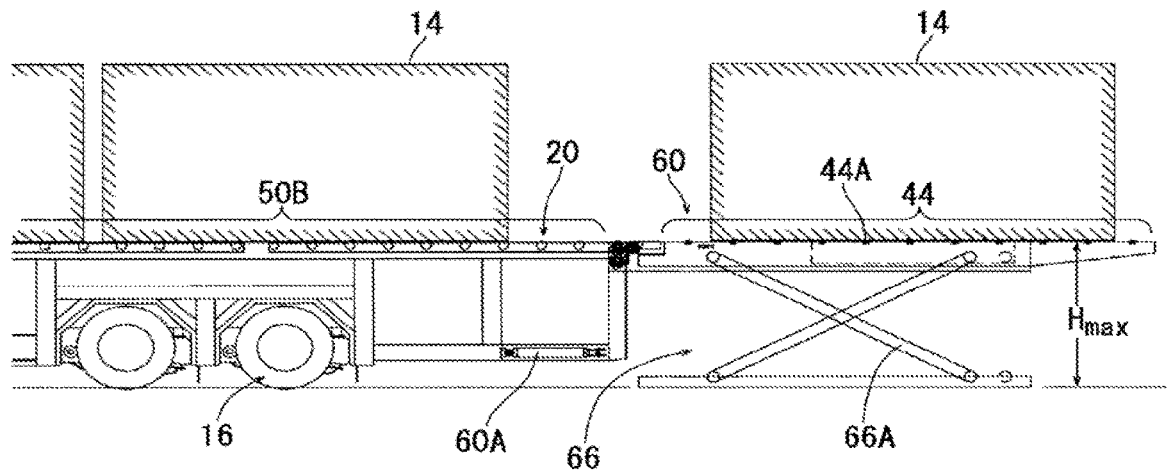

The rear elevating floor 60, as shown in FIG. 13, is configured to form a horizontal expanding floor capable of placing a single aviation container 14 at the same height as the container deck 20 in succession further rearward from the rear end of the container deck 20 during container loading and unloading, and to form a gate floor at the trailer rear end which rises at a right angle from a horizontal state and closes the trailer rear end, as shown in FIG. 2, about the rear end of the container deck 20.

Figure 14:
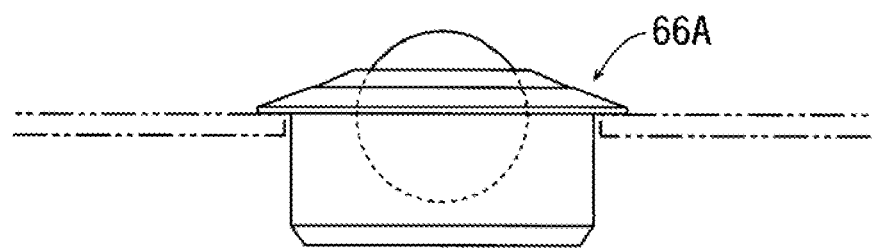
Figure 15:
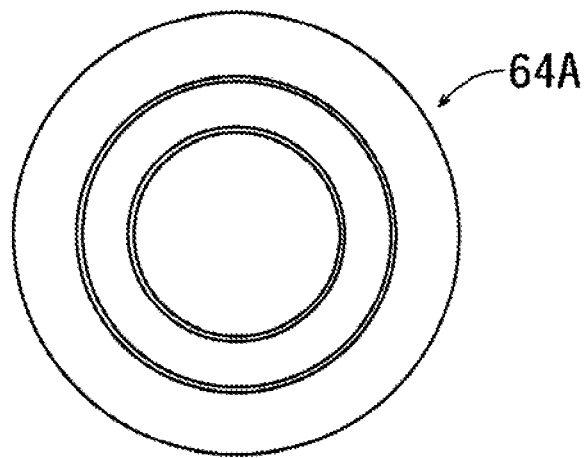

The rear elevating floor 60 includes a ball roller conveyor 64 on an upper end surface including a rear turntable 63. The ball roller conveyor 64, as shown in FIGS. 14 and 15, constituted by arranging a plurality of ball units 64A facing upward with a rotatable ball. Then the aviation container 14, freely movably placed on the ball roller conveyor in an arbitrary direction in a horizontal plane, and from any of the left and right sides of the trailer vehicle body, and it is configured to be able to load and unload the aviation container 14.

The ball roller conveyor 64 of the rear elevating floor 60 is capable of loading and unloading the aviation container 14 in the posture, the long side of the top panel 14A is in the vehicle body width direction, and the stacked aviation container 14 is a long side of the top panel 14A in a horizontal plane is configured to be rotated in a horizontal plane to the posture of the vehicle body front-rear direction, also, it is possible to load and unload the aviation container 14 from the vehicle body rear direction.

As shown in FIGS. 1 and 3, the central elevating floor 40 and the rear elevating floor 60 further include a central electric table lifter 46 and a rear electric table lifter 66 with X links 46A and 66A, respectively.

Figure 16:
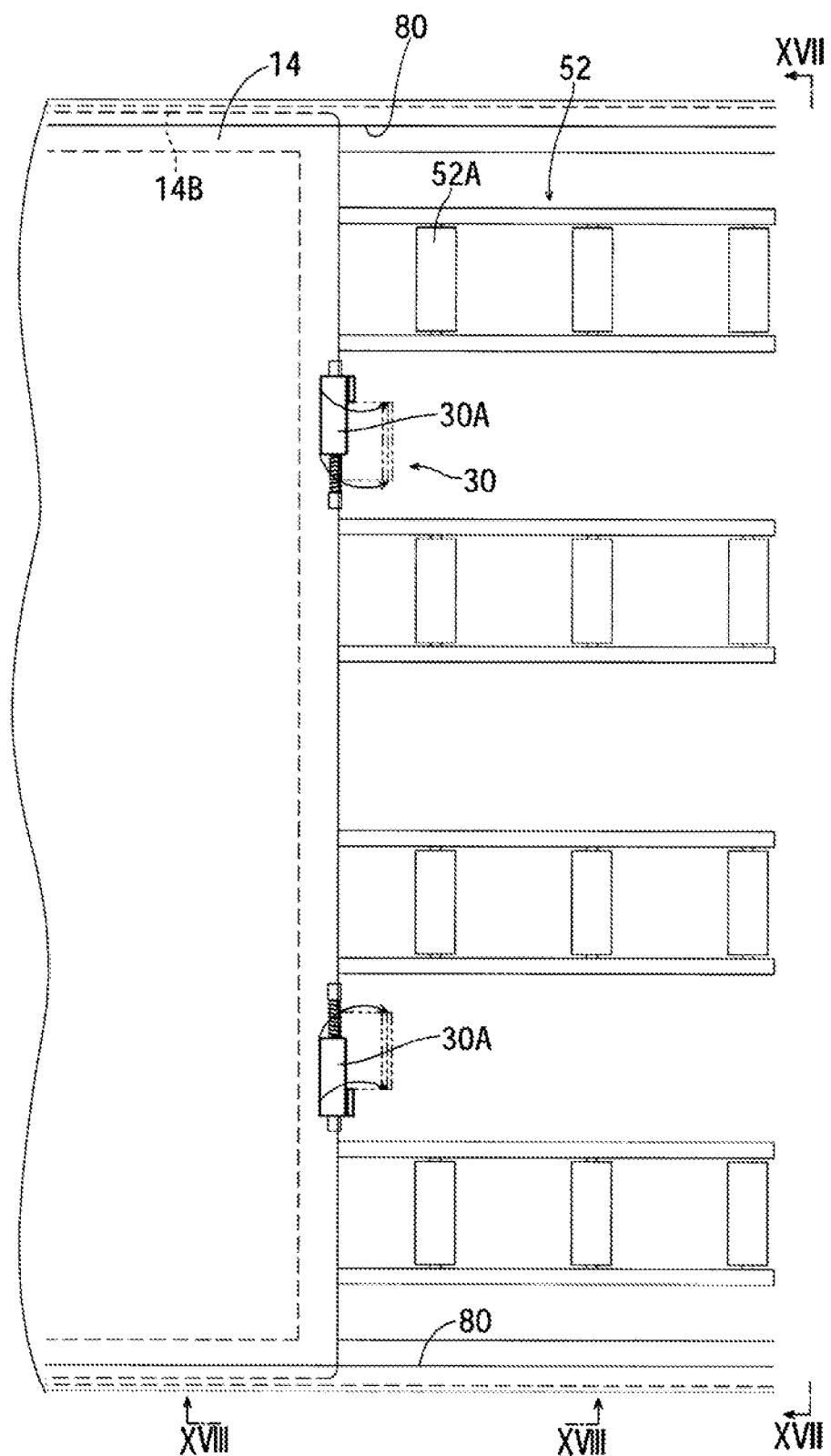
Figure 17:
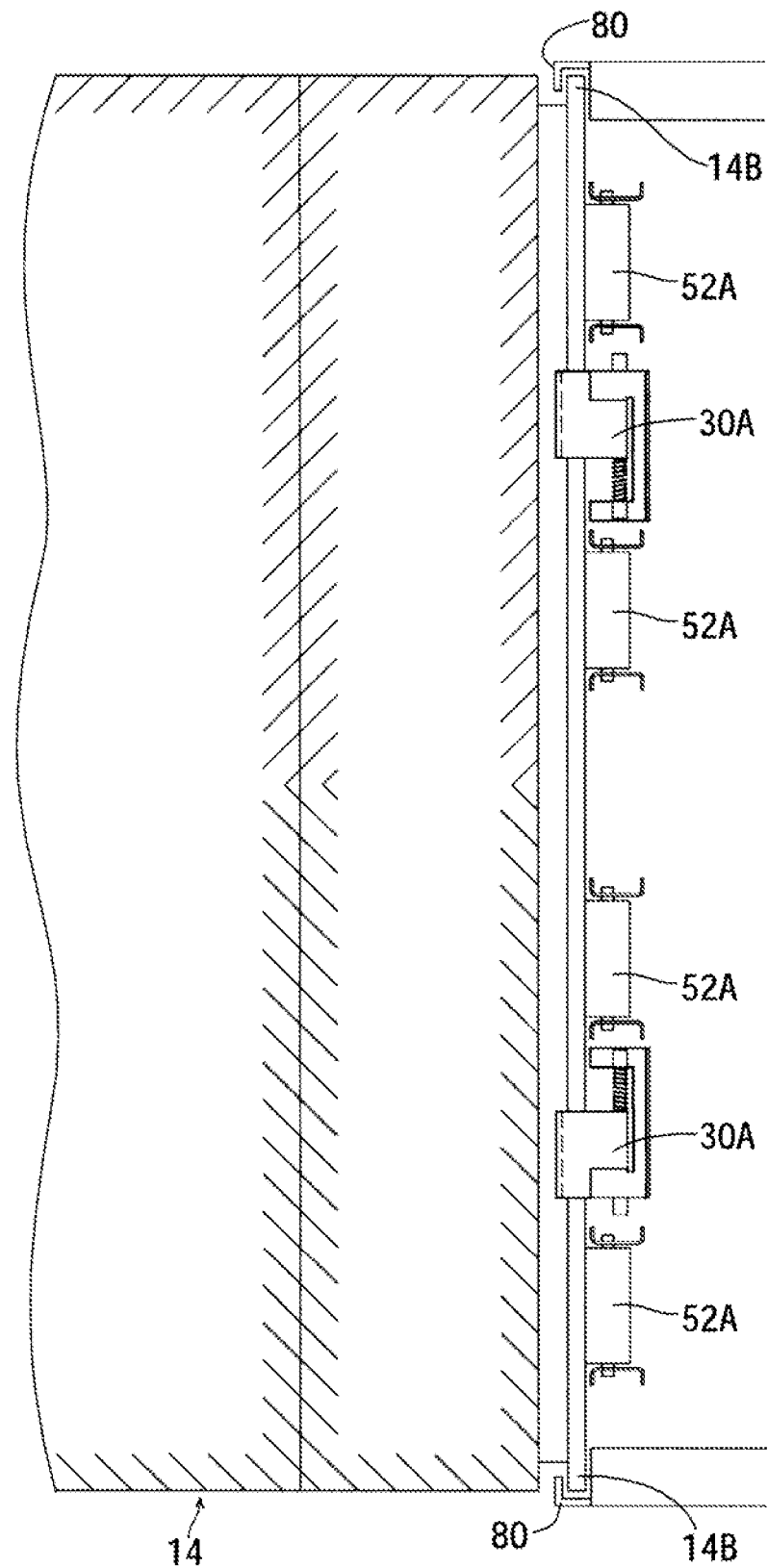
Figure 18:
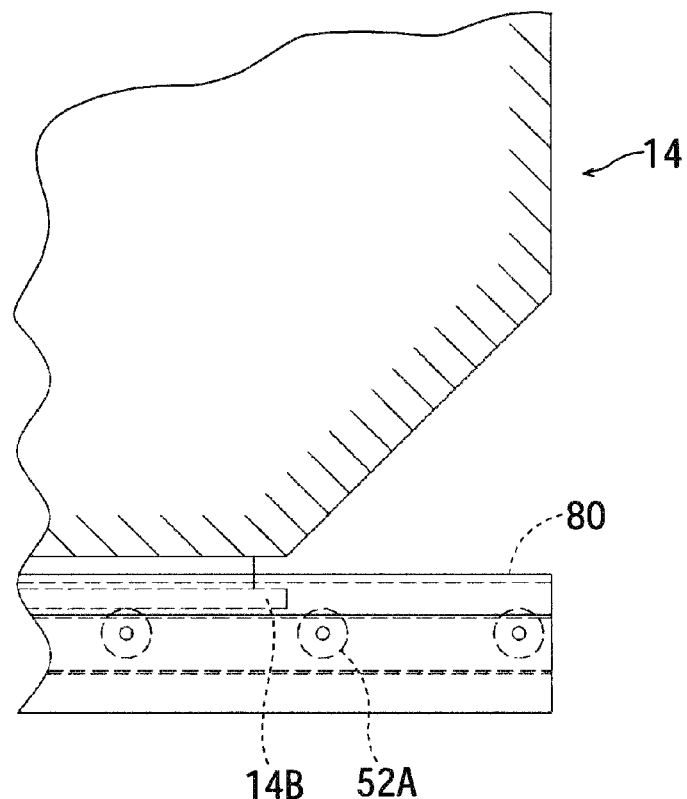
FIG. 18 Cross-sectional plan view taken along XVIII-XVIII line of FIG. 16

Aviation container 14 has a long sliding part 14B in the vehicle body front-rear direction on both sides in the body width direction of the bottom side (see the FIG. 7). The front mounting floor 50A and the rear mounting floor 50B, as shown in FIGS. 16 to 18, for guiding the sliding part 14B slidably engaged in the vehicle body front-rear direction, a pair of fixed side guides 80 in the body width direction of the cross-section is U-shaped.

Figure 19:
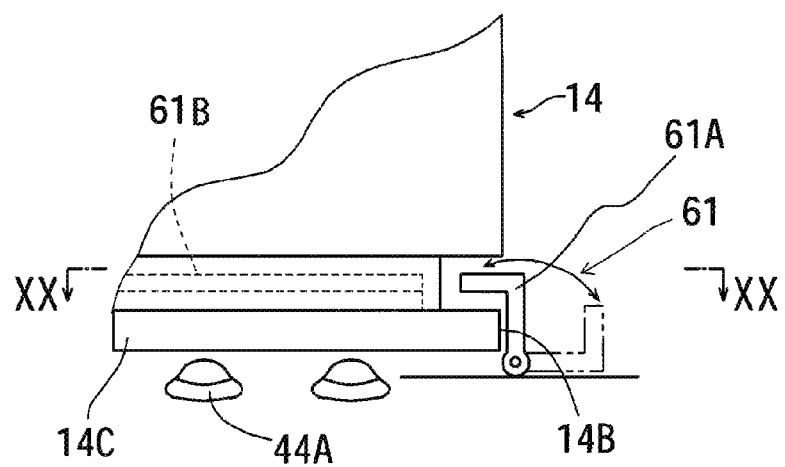
FIG. 19 Side view from the rear of the vehicle body schematically showing the engagement state between the movable side guide and the aviation container on the central elevating floor FIG. 20 Cross-sectional plan view taken along XX-XX line of FIG. 19
Figure 20:
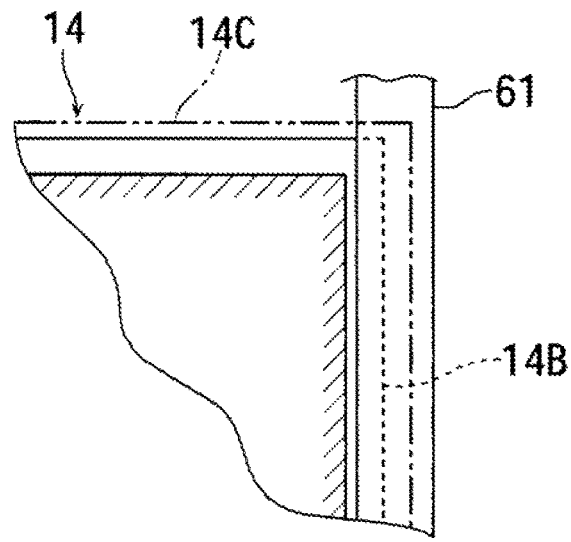

Further, the rear elevating floor 60, as shown in FIGS. 19 and 20, to guide slidably engaged with the sliding part 14B of the aviation container 14, a rear movable side guide 61 of the cross section is U-shaped is provided.

The rear movable side guide 61 includes a front-rear direction guide 61A which is arranged in alignment thereto on the extension line of the vehicle body front-rear direction of the fixed side guide 80, and a lateral guide 61B for guiding the aviation container 14 on the lateral direction of the vehicle body which is arranged perpendicular to the front-rear direction guide 61A.

The diameter of the rear turntable 63 in the rear elevating floor 60 is smaller than the width between, each pair of the front-rear direction guides 61A and 61A, and between the lateral guides 61B and 61B, together with these are arranged to pass through the vehicle body width direction both outside of the central turntable 43, when loading and unloading aviation containers, as shown by the two-dot chain line in FIG. 19, it is configured to wait in a retracted position that does not interfere with the aviation container 14.

Figure 23:
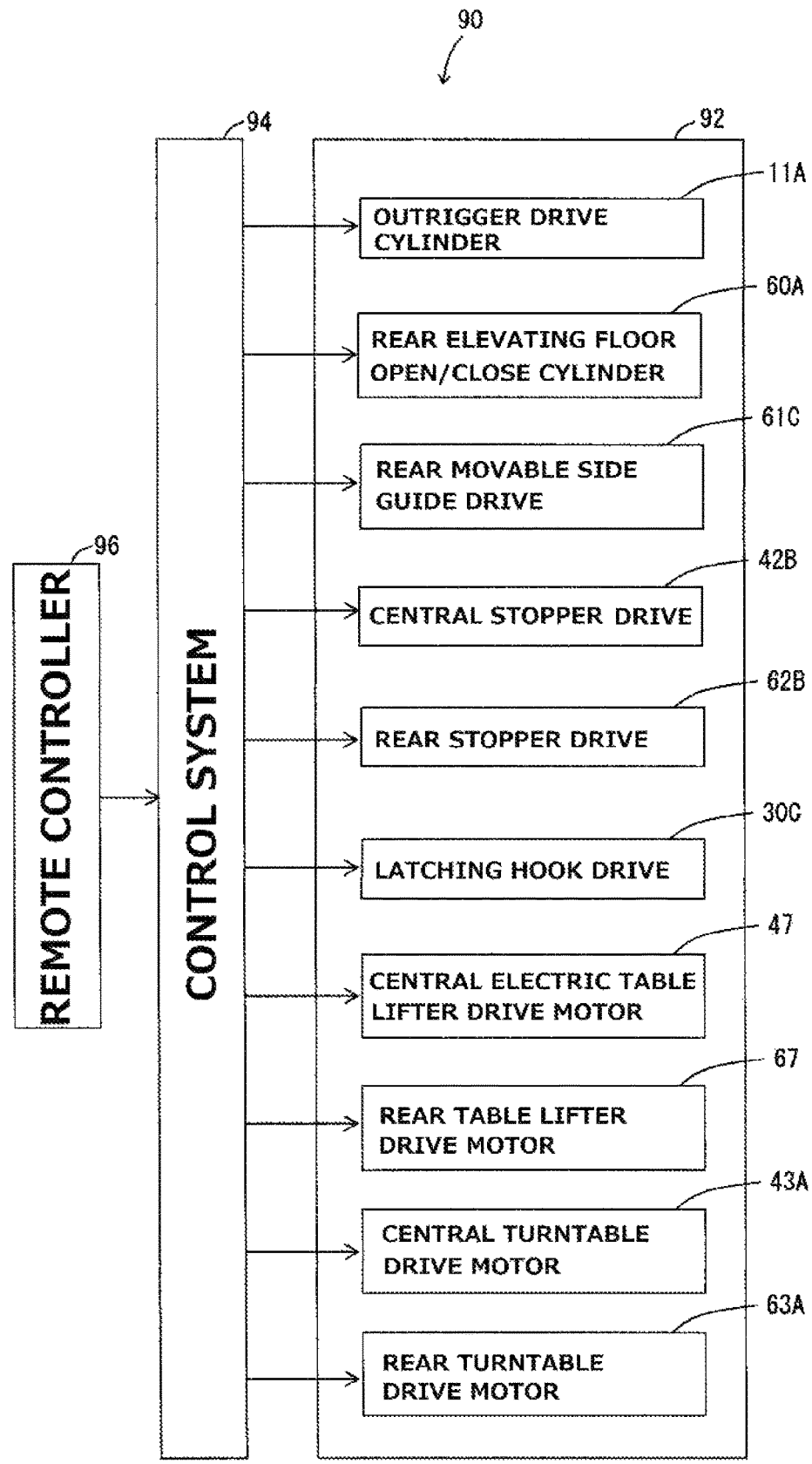

As shown in FIG. 23, in the rear elevating floor 60, the front-rear direction guide 61A, a rear movable side guide driving device 61C for driving the lateral guide 61B to the operating position or retracted position, the rear stopper 62A for preventing excessive passes of the placed aviation container 14, and a rear stopper driving device 62B for driving it to the stop position or retracted position.

Figure 21A:
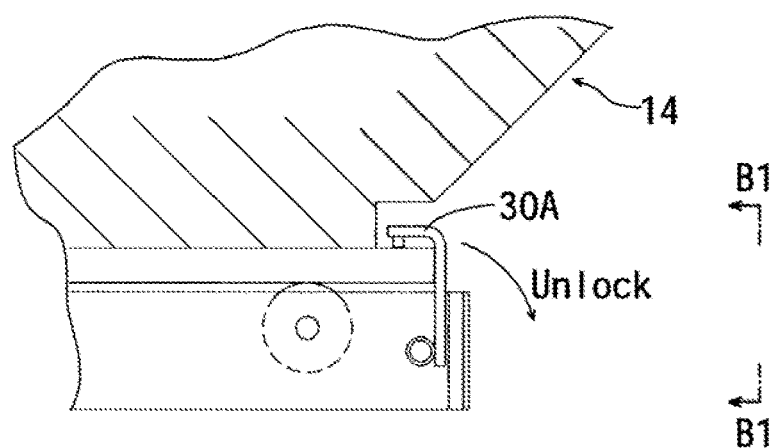
FIG. 21A Side view schematically showing a lashing device in a state in which an aviation container is fixed FIG. 21B B1-B1 line-of-sight diagram of FIG. 21A FIG. 22A Side view schematically showing lashing device with an aviation container released FIG. 22B B2-B2 line-of-sight diagram of FIG. 22A FIG. 23 Block diagram showing each drive unit and its control system in the first embodiment
Figure 21B:
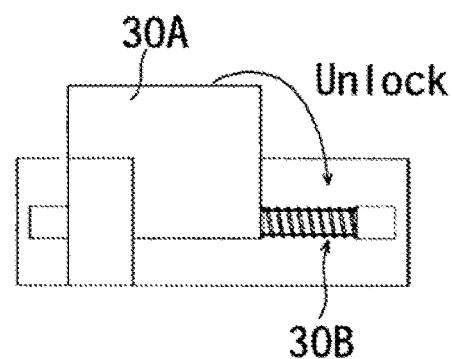
Figure 22A:
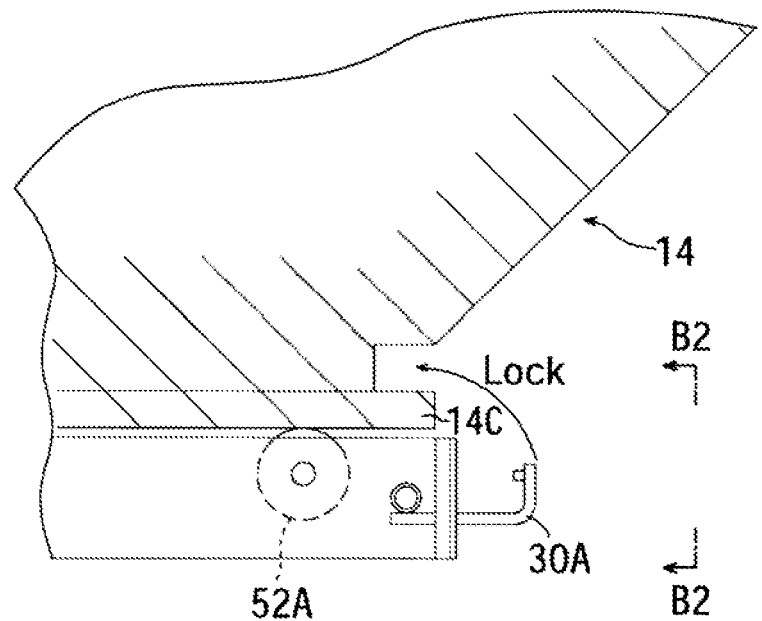
Figure 22B:
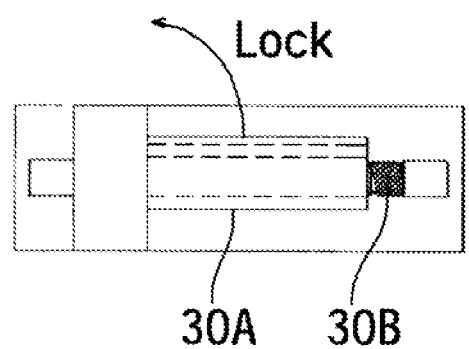

Lashing device 30, in the front mounting floor 50A and the rear mounting floor 50B, the aviation container 14, in a state in which the sliding part 14B is restrained in the body width direction by the fixed side guide 80, FIG. 21A, FIG. 21B, FIG. 22A, as shown in FIG. 22B, the top panel shorter side perpendicular to the top panel long side direction end of the left and right sliding part 14B parallel, and a latching hook 30A to be latched/unlocked to the front and rear end latching portion 14C of the aviation container 14.

In addition, the lashing device 30 is configured to be able to lash the aviation container 14 placed on the central elevating floor 40 at the center elevation floor upper limit height $H_{max}$ position and the center elevation floor lower limit height $H_{min}$ position, and the trailer 10 is able to run even when the aviation container 14 is lashed on the center elevation floor 40 at the center elevation floor lower limit height $H_{min}$ position.

Reference numeral 30B in FIG. 21B denotes a compressed-coil spring that biases the latching hook 30A so that the state shown in FIG. 21A is maintained at the time of lashing (at the time of Lock) of the aviation container 14. When unlocked, as shown in FIG. 22A, FIG. 22B, by compressing the compression coil spring 30B by the latching hook driving device 30C, and to maintain the latching hook 30A in the disengaged state.

FIG. 23 is a block diagram showing a control unit 90 for controlling a drive device, a motor, the cylinder or the like, in this embodiment 1, the control unit 90 includes a drive unit 92, a control unit 94 and a remote controller 96.

Drive unit 92 includes an outrigger driving cylinder 11A for driving the outrigger 11, a rear elevation floor open/close cylinder 60A for driving the rear elevating floor 60 vertically rises to constitute a rear gate or constitutes an extended floor in a horizontal, a rear movable side guide driving device 61C for driving the rear movable side guide 61, a central stopper driving device 42B for driving the central stopper 42A, a rear stopper driving device 62B for driving the rear stopper 62A, a latching hook driving device 30C for driving the latching hook 30A in the lashing device 30, a central electric table lifter driving motor 47 for driving the central electronic table lifter 46, a rear table lifter drive motor 67 for driving the rear electric table lifter 66, and a central turntable drive motor 43A for driving the central turntable 43, and a rear turntable drive motor 63A for driving the rear turntable 63.

The control unit 94, based on an instruction signal input from the remote controller 96 is intended to control the driving device and the cylinder or motor of the drive unit 92.

Next, an example of the process of loading the aviation container 14 in the first embodiment using the central elevating floor 40 to the trailer 10 will be described.

Incidentally, loading and unloading both simultaneously or only one of the loading and unloading to the trailer 10 in the central elevating floor 40 and the rear elevating floor 60 may be loaded and unloaded from both, unloaded from only one, or vice versa.

First, the outrigger 11 is extended using an outrigger drive cylinder 11A. At this time, adjust so that the upper surface of the ball conveyor 44 is 1 to 3 cm lower than the stackable height, and fix the length (height) of the outrigger 11.

The height of the central elevating floor 40 is lowered to $H_{min}$ of the lower limit height of the elevating floor (hereinafter referred to as the lower limit height), and further rotated by 90 degrees from the state of FIG. 2 to the state of FIG. 5 by the central turntable 43, the posture for receiving the aviation container 14 from the vehicle body lateral direction.

Next, the aviation container 14 is transferred from the lateral direction of the vehicle body onto the horizontal roller conveyor 44, and the central elevating floor 40 is raised to the elevation floor upper limit height $H_{max}$ by the central electric table lifter 46 while the attitude of the aviation container 14 remains unchanged.

The central turntable 43 is then driven by a central turntable drive motor 43A to rotate the aviation container 14 by 90° to align it with the fixed side guide 80 (see FIG. 2).

Fixed side guide 80 as a guide, transferring the aviation container 14 on the fixed roller conveyor 52 of the front mounting floor 50A, to secure the aviation container 14 by lashing device 30.

The second aviation container 14 is also fixed on the central elevating floor 40 in the same manner as described above.

Next, the central elevating floor 40 is fixed to the upper limit height position. Incidentally, by lowering the center of gravity of the trailer, in order to improve the running stability, in a state of placing the aviation container 14, it is also possible to fix the central elevating floor 40 to the lower limit height position.

Finally, after confirming the completion of loading of the aviation container 14 by the rear elevating floor 60, pulling up the outrigger 11, to finish the loading.

Next, the process of unloading using the central elevating floor 40 of the aviation container 14.

First, the outrigger 11 is extended using an outrigger drive cylinder 11A. At this time, adjust so that the upper surface of the ball conveyor 44 is 1 to 3 cm higher than the stackable height to fix the height of the outrigger 11.

The posture of the aviation container 14 remains unchanged, raising the central elevating floor 40 to an upper limit height, and the central turntable 43 rotates the aviation container 14 by 90° to a posture movable in the vehicle body lateral direction.

Next, the lashing device 30 is disengaged, and the aviation container 14 is extruded laterally, followed by the aviation container 14 on the front mounting floor 50A to disengage the lashing device 30 and move it onto the central elevating floor 40.

Next, the central turntable 43 rotates the aviation container 14 by 90° to the vehicle body lateral direction, and then fed from the central elevating floor 40.

Next, the central elevating floor 40 is fixed to the upper limit height position or the lower limit height position, and the container loading and unloading by the rear elevating floor 60 is confirmed to be completed, the outrigger 11 is pulled up to finish the unloading.

The process of loading the aviation container 14 using the rear elevating floor 60 will be described.

First, the rear elevating floor 60 is opened rearward by the rear elevating floor open/close cylinder 60A to form a horizontal extended floor as shown in FIGS. 3 and 4.

Next, the outrigger 11 is extended. At this time, adjust the height of the outrigger 11 so that it is 1 to 3 cm lower than the height that can be loaded and unloaded on the upper surface of the ball conveyor 44, and fix it.

By the rear electric table lifter 66, the rear elevating floor 60 is set to the lower limit height H min of the elevating floor, the condition shown in FIG. 3 is set, and further, the rear movable side guides 61 are set to the attitude of receiving the aviation container 14 from the lateral direction of the vehicle body or from the rear direction.

The rear stopper 62A of the rear elevating floor 60 is made to protrude from the upper surface of the ball conveyor 44, and is set to a stopper state abutting the tip of the aviation container 14 which is transferred.

The aviation container 14 is loaded from the vehicle body lateral direction and guided by the lateral guide 61B on the ball conveyor 44, when loading from the rear, the front-rear direction guide 61A as a guide. Next, the rear elevating floor 60 is raised to the elevating floor upper limit height $H_{max}$ while the attitude of the aviation containers 14 remains unchanged.

After the lateral guide 61B is in the retracted position, the rear turntable 63 rotates the aviation container 14 laterally loaded on the vehicle body by 90°, or the aviation container 14 loaded from the rear of the vehicle body is not rotated, the front-rear direction guide 61A is left as it is, to align the aviation container 14 to the fixed side guide 80.

Next, the aviation container 14 is transferred to the fixed roller conveyor 52 of the rear mounting floor 50B by the fixed side guide 80 as a guide, and is moved to the front end of the rear mounting floor 50B, where, the lashing device 30, to secure the aviation container 14.

The second aviation container 14 is loaded from the rear elevating floor 60 and transferred to the rear side of the first loaded aviation container 14 of the rear mounting floor 50B, secured by lashing device 30.

Finally, the rear elevating floor 60 is vertically raised by the rear elevating floor open/close cylinder 60A to close the rear end of the tractor as a rear gate, and after confirming completion of loading of the aviation container 14 by the central elevating floor 40, the outrigger 11 is pulled up to make the trailer for aviation container transportation 10 capable of traveling.

When the rear end of the trailer for aviation container transportation 10 is moved from the aviation container 14 to the cargo platform at the distribution center or the like to unload from the rear elevating floor 60, the rear elevating floor 60 is opened rearward to form a horizontal extended floor by the rear elevating floor open/close cylinder 60A as shown in FIG. 3, and the outrigger 11 is extended by the outrigger driving cylinder 11A. Here, the upper surface of the ball conveyor 44 is fixed by adjusting the height of the outrigger 11 so as to be 1 to 3 cm higher than the loading and unloading possible height.

The rear elevating floor 60 is set to the rear elevating floor upper limit height $H_{max}$ by the rear electric table lifter 66, and then the front-rear direction guide 61A is made to protrude from the retracted position by the rear movable side guide drive 61C to align with the fixed side guide 80, the lashing device 30 of the rearmost (first) aviation container 14 is released, and the aviation container 14 is guided from the rear mounting floor 50B by the front-rear direction guide 61A to move onto the ball conveyor 44.

Aviation container 14, or a state capable of being fed in the rear direction as it is by the front-rear direction guide 61A, or, after the front-rear direction guide 61A to the retracted position by the rear movable side guide drive unit 61C, by the rear turntable 63, the aviation container 14 by 90° rotated to enable delivery in the lateral direction, then, as a guide, the rear movable side guide 61, to transfer the aviation container 14 to the unloading yard or the like.

Repeat the above to transfer the second aviation container 14 left on the rear mounting floor 50B to the unloading yard or the like.

The rear end of the rear elevating floor 60 is lifted vertically by the rear elevating floor open/close cylinder 60A to a state of a rear gate for closing the rear end of the tractor, and after confirming completion of unloading of the aviation container 14 by the central elevating floor 40, the outrigger 11 is pulled up to finish unloading.

The trailer for aviation container transportation 10 according to the first embodiment includes two elevating floors, namely, the central elevating floor 40 and the rear elevating floor 60, and can be quickly loaded or unloaded from both or one of them.

The present invention is not limited to the above, and the trailer for aviation container transportation may be provided only with the central elevating floor 40 and not with the rear elevating floor 60, and may be provided only with the rear elevating floor 60 without the central elevating floor 40.

Furthermore, in the first embodiment, each of the central elevating floor 40 and the rear elevating floor 60, respectively, has a configuration using an electric table lifter having an X link, the present invention is not limited thereto, it may be configured to be raised and lowered by a chain of the motor drive.

Further, the central elevating floor 40 is configured to rotate integrally with the turntable may be configured to use a ball roller conveyor as well as the rear elevating floor 60. In this case, it is not necessary to return the movable side guide to the retracted position.

REFERENCE SIGNS LIST

10 Trailer for aviation container transportation (Trailer)
11 Outrigger
11A Outrigger drive cylinder
12 Tractor
12A Connecting part
14 Aviation container
14A Top panel
14B Sliding part
14C Front and rear end latching portion
16 Rear wheel
16A Wheel house
20 Container deck
30 Lashing device
30A Latching hook
30B Compression coil spring
30C Latching hook drive
40 Central elevating floor
40A Arc-shaped leading edge
40B Arc-shaped trailing edge
41 Central movable side guide
41A Front-rear direction guide
41B Lateral guide
41C Central movable side guide drive unit
42A Central stopper
42B Central stopper drive
43 Central turntable
43A Central turntable drive motor
44 Horizontal roller conveyor
44A Horizontal roller
46 Central Electric Table Lifter
46A X link
47 Central Electric Table Lifter Drive Motor
50 Mounting floor
50A Front mounting floor
50B Rear mounting floor
52 Fixed roller conveyor
52A Horizontal roller
60 Rear elevating floor
60A Rear elevating floor open/close cylinder
61 Rear movable side guide
61A Front-rear direction guide
61B Lateral guide
61C Rear movable side guide drive
62A Rear stopper
62B Rear stopper drive
63 Rear turntable
63A Rear turntable drive motor
64 Ball roller conveyor
64A Ball unit
66 Rear electric table lifter
66A X link
67 Rear table lifter drive motor
70 Container loading/unloading equipment
80 Fixed side guide
82 Movable side guide 90 Control unit
92 Drive unit
94 Control system
96 Remote controller

The invention claimed is:

1. A trailer for aviation container transportation provided with a container deck horizontally arranged on which a plurality of aviation containers can be placed in a row in a front-rear direction of a body of the trailer, a lashing device for fixing the plurality of aviation containers placed on the container deck, the container deck being adapted to place an aviation container of the plurality of aviation containers in a posture in which a length of the aviation container is parallel to the front-rear direction of the body, a top panel of the aviation container having a rectangular shape in a plan view, and the aviation container including, at a bottom of the aviation container, container sliding parts extending along a longitudinal direction of the aviation container at both ends in a width direction of the aviation container, wherein the container deck is provided with an elevating floor horizontally arranged and a mounting floor horizontally arranged, the elevating floor is at at least one of an intermediate portion and a rear end portion in the front-rear direction of the body, the elevating floor is configured to horizontally load and unload the aviation container of the plurality of aviation containers from any of left and right sides of the body, the mounting floor is adjacent to the elevating floor, and fixed on the body in a vertical direction, the mounting floor includes a first roller conveyor for movably placing the aviation container in the front-rear direction of the body and a pair of fixed side guides having a U-shaped cross-section and being arranged in a width direction of the body, the first roller conveyor is horizontally arranged at a vertical position higher than a vertical position of a wheel house of a rear wheel of the trailer, and is comprised of a plurality of horizontal rollers arranged in the front-rear direction of the body, each of the plurality of horizontal rollers being rotatably supported on a horizontal axis of the body, the pair of fixed side guides are configured to engage with the container sliding parts slidably in the front-rear direction of the body, the elevating floor includes a turntable and a second roller conveyor, and is configured to be lifted and lowered between an upper limit height and a lower limit height of the elevating floor with the aviation container being horizontally mounted on the elevating floor, the upper limit height being a height of an upper surface of the first roller conveyor, the lower limit height being a container loading and unloading height, the lower limit height being at a position lower than the vertical position of the wheel house of the rear wheel, the turntable is configured to rotate the aviation container placed on the turntable in a horizontal plane, the elevating floor is configured to rotate entirely in a horizontal plane integrally with the turntable, and the elevating floor has an arc-shaped leading edge convex forwardly and an arc-shaped trailing edge convex rearwardly in the plan view, a radius of the arc-shaped leading edge and a radius of the arc-shaped trailing edge are adapted to coincide with a rotation locus of an outer peripheral portion of the elevating floor rotated by the turntable, the elevating floor integrally includes a pair of elevating floor side guides arranged in the width direction of the body, the pair of elevating floor side guides having a U-shaped cross-section, and the pair of the elevating floor side guides being arranged to slidably engage with the container sliding parts along the longitudinal direction of the aviation container, and the pair of elevating floor side guides are integrally rotatable with the turntable and adapted to be rotated to be parallel with the fixed side guides in the front-rear direction or perpendicular to the fixed side guides in the front-rear direction.

2. The trailer for aviation container transportation according to claim 1, wherein the elevating floor is provided at a position adjacent to a front side of the rear wheel in the front-rear direction of the body, the elevating floor includes the turntable and the second roller conveyor, a height of an upper surface of the first roller conveyor in the mounting floor being an upper limit height of the elevating floor, a height of a position lower than the vertical position of the wheel house of the rear wheel being a lower limit height of the elevating floor, and in a state of placing the aviation container horizontally on the elevating floor, the turntable and the second roller conveyor are integrally liftable, the mounting floor comprises a front mounting floor at a front side of the elevating floor in the front-rear direction of the body and a rear mounting floor at a rear side of the elevating floor in the front-rear direction of the body, and the front mounting floor is capable of carrying at least one aviation container of the plurality of aviation containers, and the rear mounting floor is capable of carrying at least two aviation containers of the plurality of aviation containers.

3. The trailer for aviation container transportation according to claim 2, wherein the elevating floor integrally includes the pair of elevating floor side guides arranged in the width direction of the body in the plan view, the pair of elevating floor side guides having a U-shaped cross-section, and the pair of the elevating floor side guides being arranged to slidably engage with the container sliding parts along the longitudinal direction of the container, the elevating floor side guides are disposed on both sides of the turntable in the width direction of the body, when loading and unloading the aviation container from the outside in the width direction of the body, the elevating floor side guides are configured to wait in a retracted position that does not interfere with the aviation container.

4. The trailer for aviation container transportation according to claim 1, wherein the second roller conveyor of the elevating floor is a horizontal roller conveyor in which a plurality of horizontal rollers movably mount the aviation container in a front-rear direction, wherein each of the plurality of horizontal rollers are rotatably supported on an axis parallel to the width direction of the body when the elevating floor side guides are aligned in the front-rear direction of the body.

5. The trailer for aviation container transportation according to claim 1, wherein the pair of elevating floor side guides are integrally supported by the turntable and are configured to rotate synchronously with the turntable.

6. The trailer for aviation container transportation according to claim 2, wherein
a total of four outriggers are attached to both outer sides in the width direction of the body at positions in contact with a rear side of the rear wheel and a front end of the body,
each outrigger is configured to adjust the height of the body so that an upper surface of the roller conveyor of the elevating floor at the lower elevating floor height is 1 to 3 cm lower than an unloading height $H_{unlo}$ of the container loading/unloading device when an aviation container is loaded, and the upper surface of the roller conveyor at the lower elevating floor height is 1 to 3 cm higher than a loading height $H_{lo}$ of the container loading/unloading device when an aviation container is unloaded.

7. The trailer for aviation container transportation according to claim 2, wherein
the elevating floor is configured to be fixed at the lower limit height of the elevating floor while the trailer is traveling.

8. A trailer for aviation container transportation provided with a container deck horizontally arranged on which a plurality of aviation containers can be placed in a row in a front-rear direction of a body of the trailer, a lashing device for fixing the plurality of aviation containers placed on the container deck, the container deck being adapted to place an aviation container of the plurality of aviation containers in a posture in which a length of the aviation container is parallel to the front-rear direction of the body, a top panel of the aviation container has a rectangular shape in a plan view, and the aviation container including, at a bottom of the aviation container, container sliding parts extending along a longitudinal direction of the aviation container at both ends in a width direction of the aviation container, wherein
the container deck is provided with a central elevating floor, a rear elevating floor and a mounting floor horizontally arranged respectively and, the central elevating floor is at an intermediate portion of the body in the front-rear direction of the body, the rear elevating floor is at a rear end portion of the body in the front-rear direction of the body, and the central elevating floor and the rear elevating floor are configured to load and unload horizontally the aviation containers from any of left and right sides of the body,
the mounting floor is adjacent to a front end of the central elevating floor in the front-rear direction of the body, or disposed between the central elevating floor and the rear elevating floor, and is fixed on the body in a vertical direction,
the mounting floor includes a first roller conveyor for movably placing the aviation containers in the front-rear direction of the body and a pair of fixed side guides having a U-shaped cross section and being arranged in a width direction of the body,
the first roller conveyor is horizontally arranged at a vertical position higher than a vertical position of a wheel house of a rear wheel of the trailer, and is comprised of a plurality of horizontal rollers arranged in the front-rear direction of the body, each of the plurality of horizontal rollers being rotatably supported on a horizontal axis of the body,
the pair of fixed side guides of the mounting floor are configured to engage with the container sliding parts slidably in the front-rear direction of the body,
the central elevating floor is provided at a position adjacent to a front side of the rear wheel in the front-rear direction of the aviation container,
the central elevating floor includes a first turntable and a second roller conveyor, and is configured to be lifted and lowered between an upper limit height and a lower limit height of the central elevating floor with the aviation container of the plurality of aviation containers being horizontally mounted on the central elevating floor, the upper limit height being a height of an upper surface of the first roller conveyor on the mounting floor, the lower limit height being a container loading and unloading height, and the lower limit height being at a position lower than the vertical position of the wheel house of the rear wheel,
the mounting floor consists of a front mounting floor at a front side of the central elevating floor in the front-rear direction of the body and a rear mounting floor at a rear side of the central elevating floor in the front-rear direction of the body,
the front mounting floor is capable of carrying at least one aviation container of the plurality of aviation containers and the rear mounting floor is capable of carrying at least two aviation containers,
the rear elevating floor is configured to form a horizontal expanding floor, in a horizontal state, on which a second aviation container of the plurality of aviation containers can be placed at a same height as the container deck, the rear elevating floor being rearward of a rear end of the container deck in the front-rear direction of the body at the time of container loading/unloading,
the rear elevating floor is configured to form a gate floor at the rear end of the container deck by rising from the horizontal state to a right angle relative to the container deck and closing the rear end of the container deck when the trailer is traveling, and the rear elevating floor in the horizontal state is configured to load/unload the second aviation container horizontally from any of the left side and right side of the body and a rear end of the body, and
the rear elevating floor includes a third roller conveyor which is a ball roller conveyor, which is on an upper surface of the rear elevating floor including a second turntable, the ball roller conveyer including a plurality of upward ball units each having a rotatable ball at an upper end for movably placing a second aviation container in an arbitrary direction in a horizontal plane.

* * * * *